United States Patent
Xiao et al.

(10) Patent No.: US 9,996,421 B2
(45) Date of Patent: Jun. 12, 2018

(54) DATA STORAGE METHOD, DATA STORAGE APPARATUS, AND STORAGE DEVICE

(71) Applicant: HUAWEI TECHNOLOGIES CO.,LTD., Shenzhen, Guangdong (CN)

(72) Inventors: Jianlong Xiao, Chengdu (CN); Peng Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 503 days.

(21) Appl. No.: 14/583,321

(22) Filed: Dec. 26, 2014

(65) Prior Publication Data
US 2015/0121130 A1    Apr. 30, 2015

Related U.S. Application Data

(63) Continuation of application No. PCT/CN2013/085485, filed on Oct. 18, 2013.

(51) Int. Cl.
*G06F 11/00* (2006.01)
*G06F 11/14* (2006.01)
(Continued)

(52) U.S. Cl.
CPC ...... *G06F 11/1435* (2013.01); *G06F 11/1441* (2013.01); *G06F 11/1666* (2013.01); *G06F 11/2092* (2013.01); *G06F 11/2015* (2013.01)

(58) Field of Classification Search
CPC ............. G06F 11/1441; G06F 11/1064; G06F 11/1435; G06F 11/2089; G06F 11/201; G06F 11/2082
See application file for complete search history.

(56) References Cited

U.S. PATENT DOCUMENTS 5,761,406 A * 6/1998 Kobayashi .......... G06F 11/1441
                                                        711/112
5,828,823 A   10/1998 Byers et al.
(Continued)

FOREIGN PATENT DOCUMENTS

CN      102035881 A      4/2011
CN      103020227 A      4/2013
(Continued)

*Primary Examiner* — Charles Ehne
(74) *Attorney, Agent, or Firm* — Huawei Technologies Co., Ltd.

(57) ABSTRACT

In a backup method, a first controller of a storage system receives a file process request, and divides the file process request into a plurality of file operations. The first controller processes each of the file operations to generate multiple pieces of file operation information. And then, the first controller writes all of the multiple pieces of file operation information into a cache protected area. When the first controller fails, it stores the multiple pieces of file operation information to a disk protected area of a disk in the storage system. After the first controller is powered on again, the first controller copies the multiple pieces of file operation information from the disk protected area to the cache protected area. And then, it writes the file operation information into a write cache. At last, the first controller stores the file operation information into a disk of the storage system.

16 Claims, 7 Drawing Sheets

(51) Int. Cl.
   *G06F 11/16* (2006.01)
   *G06F 11/20* (2006.01)

(56) References Cited

U.S. PATENT DOCUMENTS

| | | | |
|---|---|---|---|
| 8,286,028 B2 * | 10/2012 | Matsuda | G06F 11/0727 714/6.24 |
| 8,583,865 B1 * | 11/2013 | Sade | G06F 11/108 711/103 |
| 2004/0193955 A1 * | 9/2004 | Leete | H04L 1/22 714/22 |
| 2004/0267829 A1 | 12/2004 | Hirakawa et al. | |
| 2006/0206665 A1 | 9/2006 | Orsley | |
| 2006/0212644 A1 * | 9/2006 | Acton | G06F 1/30 711/103 |
| 2009/0303630 A1 * | 12/2009 | Zhou | G06F 1/263 360/55 |
| 2011/0138221 A1 * | 6/2011 | Hanaoka | G06F 11/1441 714/6.1 |
| 2011/0296126 A1 | 12/2011 | Dematapitiya | |
| 2012/0254636 A1 | 10/2012 | Tsukamoto et al. | |
| 2013/0138850 A1 * | 5/2013 | Yamashita | G06F 9/4812 710/267 |
| 2014/0317436 A1 * | 10/2014 | Yuasa | G06F 11/1441 714/3 |

FOREIGN PATENT DOCUMENTS

| | | |
|---|---|---|
| CN | 103049220 A | 4/2013 |
| EP | 1400899 A2 | 3/2004 |
| EP | 1522927 A2 | 4/2005 |
| JP | 2003167678 A | 6/2003 |
| JP | 2005018506 A | 1/2005 |
| JP | 2005115857 A | 4/2005 |
| JP | 2006048358 A | 2/2006 |
| JP | 2010191499 A | 9/2010 |

* cited by examiner

DATA STORAGE METHOD, DATA STORAGE APPARATUS, AND STORAGE DEVICE

CROSS-REFERENCE TO RELATED APPLICATIONS

This application is a continuation of International Application NO. PCT/CN2013/085485, filed on 18 Oct. 2013, which is hereby incorporated by reference in its entirety.

TECHNICAL FIELD

The present invention relates to storage technologies, and in particular, to a data storage method, a data storage apparatus, and a storage device.

BACKGROUND

For a storage device that has a file system, data that is written to the storage device must be atomic. Atomicity refers to a complete operation of a transaction, that is, data related to the transaction must be completely written or not written. In the prior art, data atomicity is guaranteed in a disk. Data in a cache is generally not atomic, that is, only data stored in a disk is considered as reliable data and can be provided for a host. In general, if a storage device has a fault, data needs to be restored from a cache and data in the cache is then written to a disk. When the data in the cache is written to the disk, a log means is used to guarantee that the data written to the disk is atomic. When a host sends, to the storage device, an access request for accessing the data, the atomic data needs to be first acquired from the disk, and then provided for the host. This prolongs a time for processing the access request sent by the host.

SUMMARY

Embodiments of the present invention provide a data storage method, a data storage apparatus, and a storage device, so as to improve the data access efficiency of a host.

According to a first aspect, an embodiment of the present invention provides a data storage method, where the method is applied to a storage system, the storage system includes a storage device and a host, the storage device includes a first controller, the first controller includes a cache protected area and a first write cache, and the cache protected area provides a data protected function; and the method includes:

receiving, by the first controller, a file processing request, splitting the file processing request into multiple file operations, separately performing file processing on each file operation, and generating multiple pieces of file operation information;

writing all the multiple pieces of file operation information to the cache protected area;

restoring the multiple pieces of file operation information from the cache protected area when the first controller is powered on again after having a fault; and acquiring data information according to the multiple pieces of file operation information and writing the data information to the first write cache, so that the host accesses the data information.

With reference to the first aspect, in a first possible implementation manner, the writing all the multiple pieces of file operation information to the cache protected area includes:

requesting storage space in the cache protected area for each piece of file operation information;

storing each piece of file operation information in the requested storage space;

determining that all the multiple pieces of file operation information are already stored in corresponding storage space; and storing, in a data structure corresponding to the cache protected area, data in the storage space in which the multiple pieces of file operation information are stored.

With reference to the first aspect, in a second possible implementation manner, the writing all the multiple pieces of file operation information to the cache protected area includes:

sending each piece of file operation information to the cache protected area successively;

determining that all the multiple pieces of file operation information are already sent to the cache protected area; and setting a flag corresponding to the multiple pieces of file operation information received in the cache protected area, where the flag is used to indicate that all the multiple pieces of file operation information are already written to the cache protected area.

With reference to the first possible implementation manner of the first aspect, in a third possible implementation manner, the storage device includes a memory, and the memory includes a protected area; and the method further includes:

when the first controller has a fault, determining, according to the data structure corresponding to the cache protected area, that the cache protected area includes the multiple pieces of file operation information; and storing the multiple pieces of file operation information in the protected area of the memory by using a power failure protected program.

With reference to the second possible implementation manner of the first aspect, in a fourth possible implementation manner, the storage device includes a memory, and the memory includes a protected area; and the method further includes:

when the first controller has a fault, determining, according to the flag, that the cache protected area includes the multiple pieces of file operation information; and storing the multiple pieces of file operation information in the protected area of the memory by using a power failure protected program.

With reference to the first aspect, in a fifth possible implementation manner, the storage device includes a second controller, and the second controller includes a second write cache; and the method further includes: sending, by the first controller, the multiple pieces of file operation information to the second controller, so that the second controller acquires, according to the multiple pieces of file operation information, data information corresponding to the file processing request and writes the data information to the second write cache.

According to a second aspect, an embodiment of the present invention provides a data storage method, where the method is applied to a storage system, the storage system includes a storage device and a host, the storage device includes a first controller, a second controller, and a memory, and the second controller includes a write cache; and the method includes:

receiving, by the first controller, a file processing request, splitting the file processing request into multiple file operations, separately performing file processing on each file operation, generating multiple pieces of file operation information, and sending the multiple pieces of file operation information to the second controller; and acquiring, by the second controller, data information according to the file operation information and writing the data information to the write cache, so that when the first controller has a fault, the host accesses the data information or performs an operation corresponding to the file processing request for the memory.

With reference to the second aspect, in a first possible implementation manner, the sending the multiple pieces of file operation information to the second controller includes: sending, by the first controller, a first mirror message to the second controller, where the first mirror message includes the multiple pieces of file operation information.

With reference to the second aspect, in a second possible implementation manner, the sending the multiple pieces of file operation information to the second controller includes:

sending, by the first controller, multiple second mirror messages to the second controller, where each of the second mirror messages includes one of the multiple pieces of file operation information.

With reference to the second aspect, in a third possible implementation manner, the second controller includes a cache protected area, and the cache protected area provides a data protected function; and before the acquiring, by the second controller, data information according to the file operation information and writing the data information to the write cache, the method further includes:

writing, by the second controller, all the file operation information to the cache protected area.

With reference to the third possible implementation manner of the second aspect, in a fourth possible implementation manner, the method further includes:

restoring the multiple pieces of file operation information from the cache protected area when the second controller has a fault and is powered on again;

the acquiring, by the second controller, data information according to the file operation information and writing the data information to the write cache includes:

acquiring, by the second controller, the data information according to the multiple pieces of file operation information stored in the cache protected area, and writing the data information to the write cache.

With reference to the third possible implementation manner of the second aspect, in a fifth possible implementation manner, the writing, by the second controller, all the file operation information to the cache protected area includes:

requesting storage space in the cache protected area for each piece of file operation information;

storing each piece of file operation information in the requested storage space;

determining that all the multiple pieces of file operation information are already stored in corresponding storage space; and storing, in a data structure corresponding to the cache protected area, data in the storage space in which the multiple pieces of file operation information are stored.

With reference to the third possible implementation manner of the second aspect, in a sixth possible implementation manner, the writing, by the second controller, all the file operation information to the cache protected area includes:

sending each piece of file operation information to the cache protected area successively;

determining that all the multiple pieces of file operation information are already sent to the cache protected area; and setting a flag corresponding to the multiple pieces of file operation information received in the cache protected area, where the flag is used to indicate that all the multiple pieces of file operation information are already written to the cache protected area.

According to a third aspect, an embodiment of the present invention provides a data storage apparatus, including:

a file processing module, configured to receive a file processing request, split the file processing request into multiple file operations, separately perform file processing on each file operation, and generate multiple pieces of file operation information;

a writing module, configured to write all the multiple pieces of file operation information to a cache protected area; and a restoring module, configured to restore the multiple pieces of file operation information from the cache protected area when the first controller is powered on again after having a fault, where the writing module is further configured to acquire data information according to the multiple pieces of file operation information and write the data information to a first write cache, so that the host accesses the data information.

With reference to the third aspect, in a first possible implementation manner, the writing module is configured to:

request storage space in the cache protected area for each piece of file operation information;

store each piece of file operation information in the requested storage space;

determine that all the multiple pieces of file operation information are already stored in corresponding storage space; and store, in a data structure corresponding to the cache protected area, data in the storage space in which the multiple pieces of file operation information are stored.

With reference to the third aspect, in a second possible implementation manner, the writing module is configured to:

send each piece of file operation information to the cache protected area successively;

determine that all the multiple pieces of file operation information are already sent to the cache protected area; and set a flag corresponding to the multiple pieces of file operation information received in the cache protected area, where the flag is used to indicate that all the multiple pieces of file operation information are already written to the cache protected area.

With reference to the first possible implementation manner of the third aspect, in a third possible implementation manner, the apparatus further includes a protected module, where the protected module is configured to: when the second controller has a fault, determine, according to the data structure corresponding to the cache protected area, that the cache protected area includes the multiple pieces of file operation information; and store the multiple pieces of file operation information in a protected area of a memory by using a power failure protected program.

With reference to the second possible implementation manner of the third aspect, in a fourth possible implementation manner, the apparatus further includes a protected module, where the protected module is configured to: when the first controller has a fault, determine, according to the flag, that the cache protected area includes the multiple pieces of file operation information; and store the multiple pieces of file operation information in a protected area of a memory by using a power failure protected program.

With reference to the third aspect, in a fifth possible implementation manner, the apparatus further includes a sending module, where the sending module is configured to send the multiple pieces of file operation information to the second controller, so that the second controller acquires, according to the multiple pieces of file operation information, data information corresponding to the file processing request and writes the data information to the second write cache of the second controller.

According to a fourth aspect, an embodiment of the present invention provides a storage device, where the storage device includes a first controller, a second controller, and a memory, and the second controller includes a write cache;

the first controller is configured to receive a file processing request, split the file processing request into multiple file operations, separately perform file processing on each file operation, generate multiple pieces of file operation information, and send the multiple pieces of file operation information to the second controller; and the second controller is configured to acquire data information according to the file operation information and write the data information to the write cache, so that when the first controller has a fault, a host accesses the data information or performs an operation corresponding to the file processing request for the memory.

With reference to the fourth aspect, in a first possible implementation manner, the first controller is specifically configured to send a first mirror message to the second controller, where the first mirror message includes the multiple pieces of file operation information.

With reference to the fourth aspect, in a second possible implementation manner, the first controller is specifically configured to send multiple second mirror messages to the second controller, where each of the second mirror messages includes one of the multiple pieces of file operation information.

With reference to the fourth aspect, in a third possible implementation manner, the second controller is further configured to write all the file operation information to the cache protected area.

With reference to the third possible implementation manner of the fourth aspect, in a fourth possible implementation manner, the second controller is specifically configured to request storage space in the cache protected area for each piece of file operation information, store each piece of file operation information in the requested storage space, determine that all the multiple pieces of file operation information are already stored in corresponding storage space, and store, in a data structure corresponding to the cache protected area, data in the storage space in which the multiple pieces of file operation information are stored.

With reference to the third possible implementation manner of the fourth aspect, in a fifth possible implementation manner, the second controller is specifically configured to send each piece of file operation information to the cache protected area successively, determine that all the multiple pieces of file operation information are already sent to the cache protected area, and set a flag corresponding to the multiple pieces of file operation information received in the cache protected area, where the flag is used to indicate that all the multiple pieces of file operation information are already written to the cache protected area.

According to a fifth aspect, an embodiment of the present invention provides a storage device, including:

a processor, a memory, a system bus, and a communication interface, where the processor, the memory, and the communication interface are connected by using the system bus and communicate with each other;

the communication interface is configured to communicate with a storage device;

the memory is configured to store a computer execution instruction; and the processor is configured to run the computer execution instruction and execute the data storage method described in the first aspect.

In the embodiments of the present invention, multiple pieces of file operation information corresponding to a file processing request are written to a cache protected area. Because the cache protected area provides a data protected function, when a first controller is powered on again after having a fault, the multiple pieces of file operation information can be restored from the cache protected area, and data information is acquired according to the multiple pieces of file operation information and written to a first write cache. Because all the multiple pieces of file operation information are written to the cache protected area, file operation information restored from the cache protected area when the first controller is powered on again after having a fault is also complete. Therefore, the data information acquired according to the multiple pieces of file operation information is atomic and can be directly accessed by a host. In the prior art, data information in a first write cache is not atomic and only data in a memory is atomic. Therefore, in the prior art, the data information in the first write cache cannot be directly accessed by a host and corresponding data must be read from the memory before being provided for the host. Compared with the prior art, the embodiments of the present invention improve the data access efficiency of the host.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention.

System Architecture in an Embodiment of the Present Invention

Figure 1:
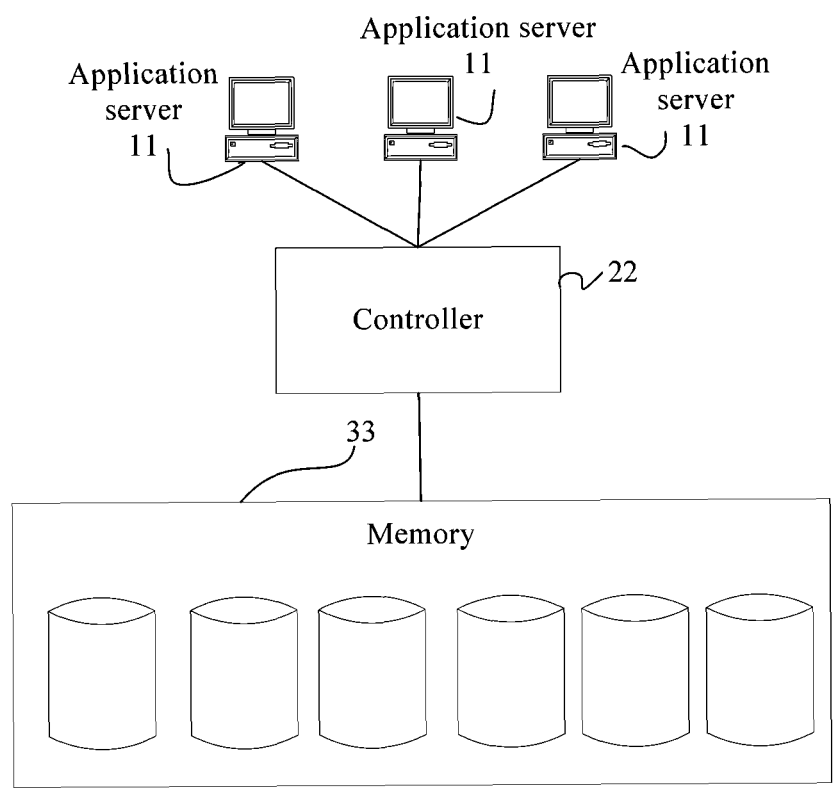
FIG. 1 is a schematic diagram of an application network architecture of a data storage method according to an embodiment of the present invention.

A data storage method provided by an embodiment of the present invention may be implemented in a storage system. FIG. 1 is a schematic diagram of an application network architecture of a data storage method according to an embodiment of the present invention. As shown in FIG. 1, the storage system includes at least one application server 11 (three shown in FIG. 1) and at least one controller 22 and one memory 33.

The application server 11 (also referred to as a host) may include any computing device known in the prior art, for example, a server or a desktop computer.

The controller 22 transmits data to the application server 11 by using the NFS/CIFS protocol and may be any computing device known in the prior art, for example, a server or a desktop computer. The controller 22 may include a processor and a cache (not shown in the figure). The processor is specifically configured to perform various operations for a file processing request, for example, a file creation operation, a file opening operation, a file reading operation, and a file writing operation. The cache is a memory existing in the controller, and has a capacity less than that of a hard disk but a speed much higher than that of a hard disk, for example, the cache may be a random access memory (random access memory, RAM) and is mainly configured to store programs or data for short-term use.

In the controller 22, a file system and other applications are further installed, for example, a power failure protected module and a mirroring module. The power failure protected module is configured to write data in the cache to the memory through a BBU or another backup battery when the system has a power failure, and the mirroring module is configured to process data that is sent by another controller 22 through a mirror channel.

In the embodiment of the present invention, a cache may include a temporary cache or a write cache. A temporary cache is configured to temporarily store data and metadata corresponding to a file processing request, and does not provide a data protected function. A write cache is configured to store data that is to be written to a memory and provides the data protected function. That a temporary cache does not provide a data protected function indicates that, when the system has a fault or the system has a power failure, all data stored in the temporary cache is lost and cannot be restored even after the system is powered on again. That a write cache provides the data protected function indicates that data stored in the write cache is not lost due to a case in which the system has a fault or the system has a power failure. Specifically, the data protected function may be a power failure protected function, where the power failure protected function indicates that, after the system has a power failure, power can still be supplied by using a backup battery (Battery Back-Up, BBU) or in another power supplying manner, so that the write cache has enough power to write data stored in the write cache to a disk protected area of the memory and, after the system is powered on again, can copy the data to the write cache from the disk protected area of the memory. Therefore, the data stored in the write cache can be considered reliable and will not be lost.

Optionally, the data protected function may also be a reset cache protected function, where the reset cache protected function indicates that a write cache is supplied with power continuously and, when the system has a power failure, an operation of writing data stored in the write cache to the memory is not performed, and when the system is powered on again, the data in the write cache is not initialized. Therefore, the data stored in the write cache is still data before the system has a power failure. Similarly, for a write cache having this function, data stored in the write cache can also be considered reliable and will not be lost.

Optionally, the data protected function may also be another function guaranteeing that data in a write cache is not lost, which is not limited herein.

In the embodiment of the present invention, a temporary cache and a write cache may be located in a same physical entity or in different physical entities, which are not limited herein. When the temporary cache and the write cache are located in different physical entities, the temporary cache does not provide the data protected function and when the system has a power failure, data in the temporary cache is lost and cannot be restored, while the write cache provides the data protected function. When the temporary cache and the write cache are located in a same physical entity (for example, a memory module), a power failure protected module may decide not to provide power failure protected for data stored in the temporary cache but to provide power failure protected for data stored in the write cache.

In addition, a cache protected area may be created in the write cache and the cache protected area also has the data protected function. When the data in the temporary cache needs to be written to the write cache, the data or information acquired according to the data may be first written to the cache protected area, and then, after it is determined that the data or the information acquired according to the data is successfully written to the cache protected area, the data is written to the write cache. Therefore, even if the system has a fault before the data is written to the write cache or is not completely written to the write cache, data can also be restored by using data or information stored in the cache protected area. Optionally, a piece of cache space may also be divided in the cache and used as the cache protected area, or another independent cache may be used as the cache protected area, which is not limited herein. It should be noted that a write cache indicates a cache excluding a cache protected area, unless otherwise specified in the embodiment of the present invention.

A form of storing data in the cache protected area may be different from that in a temporary cache or a write cache. For example, in the embodiment of the present invention, the temporary cache and the write cache may store data in a unit of data page (page). A size of a data page may be 4 KB, 8 KB, or 16 KB, which is not limited herein. That a size of a data page is 4 k is used as an example. When the data size is 8 k, two pages need to be occupied. While, the cache protected area may store data in a form of a data structure, such as a control link, a linked list, or a tree, which is not limited herein. Therefore, it can be understood that because the form of storing data in the cache protected area may be different from the form of storing data in the write cache, the cache protected area occupies less storage space when same data is stored.

The memory 33 may include storage devices known in the prior art, for example, a hard disk drive (Hard Disk Drive, HDD), a solid state drive (solid state drive, SSD), or a direct access storage device (Direct Access Storage Device, DASD).

In the embodiment of the present invention, the controller 22 and the memory 33 may be collectively referred to as storage devices.

Unless otherwise specified, the system in the embodiment of the present invention refers to a storage system and the memory in the embodiment of the present invention refers to a non-volatile memory.

Data Storage Method

Figure 2:
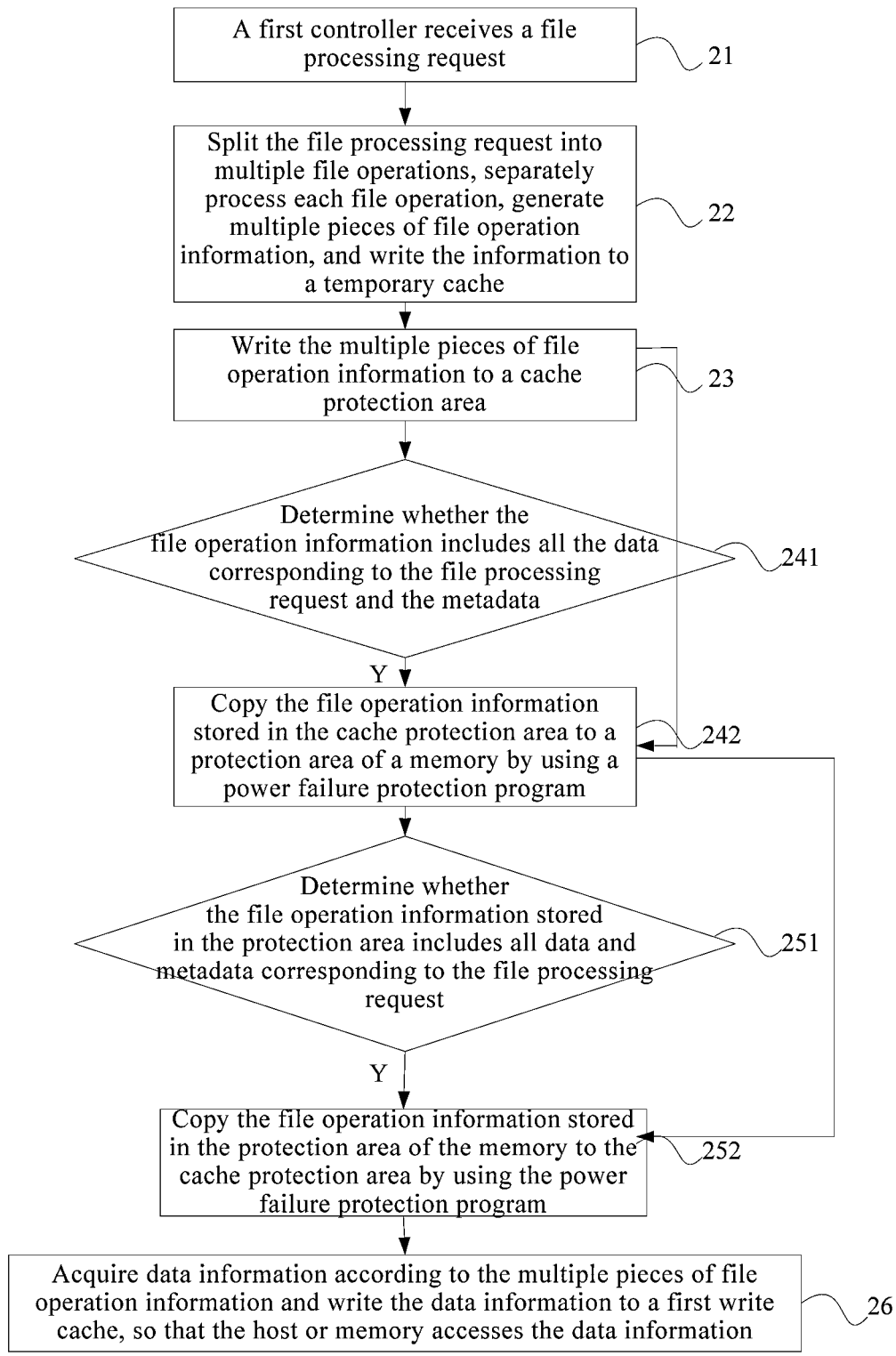
FIG. 2 is a flowchart of a data storage method according to an embodiment of the present invention.

The following describes a data storage method provided by an embodiment of the present invention. FIG. 2 is a flowchart of a data storage method according to an embodiment of the present invention. The method is applied to a storage system, the storage system includes storage devices and a host, the storage devices include a first controller and a memory, and the first controller includes a temporary cache, a cache protected area, and a first write cache; and the method includes:

Step 21: The first controller receives a file processing request.

In the embodiment of the present invention, the file processing request is sent by an application server (also referred to as a host). For example, A file processing request may be a file writing request, a file modification request, a file creation request, or a file deletion request, which is not limited herein. Different file processing requests may include different parameters. For example, a file writing request is used as an example, and the file writing request includes parameters such as a file ID, a file offset (offset), a file length (length), and to-be-written data.

Step 22: Split the file processing request into multiple file operations, separately process each file operation, generate multiple pieces of file operation information, and write the information to the temporary cache.

For a storage device that has a file system, the file system often needs to split a file processing request into multiple file operations according to an operation type of the file processing request when processing the file processing request. For example, the file system needs to split a file writing request into a data modification file operation and a metadata modification file operation; for another example, the file system needs to split a file creation request into a parent directory modification file operation and a file operation for file creation; for still another example, the file system needs to split a file renaming request into a source directory modification file operation and a destination directory modification file operation.

Optionally, the file system splits the file processing request into the multiple file operations according to the operation type of the file processing request and, when processing the operations separately, may record a quantity of all data entries and a quantity of metadata entries corresponding to the file processing request.

It can be understood that, when processing a file processing request, the first controller actually performs semantic conversion or other file processing successively for each file operation split from the file processing request. Each time after processing a file operation, the first controller writes data corresponding to the file operation and metadata to the temporary cache. Therefore, after the first controller processes a last file operation and writes the data corresponding to the last file operation and the metadata to the temporary cache, all the data and the metadata corresponding to the file processing request are also written to the temporary cache. Therefore, in the embodiment of the present invention, data stored in the temporary cache is all the data and the metadata corresponding to the file processing request. Similarly, in the embodiment of the present invention, the multiple pieces of file operation information are all the data and the metadata corresponding to the file processing request.

For different file processing requests, file operation information generated for the different file processing requests is also different. When the file processing request is a file writing request, file operation information of the file processing request may be to-be-written data, metadata, and so on carried in the file writing request; when the file processing request is a file modification request, file operation information of the file modification request may be to-be-written data, metadata, and so on carried in the file modification request; when the file processing request is a file creation request, file operation information of the file creation request may be directory information, metadata, and so on; when the file processing request is a file deletion request, file operation information of the file deletion request may be special page data for releasing file space, and the data and metadata after deletion, and so on.

The following steps are described by using a file writing request as an example. For the file writing request, file operation information generated for the file writing request may include a file ID, a file offset (offset), a file length (length), a write time, to-be-written data, and so on.

It should be noted that in the embodiment of the present invention, the temporary cache is only used to store data temporarily. The data stored in the temporary cache is discrete, and the data is not managed by using a specific data structure. The data stored in the temporary cache cannot be directly provided for the application server.

Step 23: Write the multiple pieces of file operation information to the cache protected area.

Specifically, the first controller may write the file operation information such as a file ID, a file offset, a file length, a write time, and to-be-written data to the cache protected area. The cache protected area provides a data protected function. After the file operation information is written to the cache protected area successfully, the file operation information is not lost due to a reason such as a system fault.

In an optional implementation manner, the writing the multiple pieces of file operation information to the cache protected area indicates that all the multiple pieces of file operation information are written to the cache protected area, that is, all the data and the metadata corresponding to the file processing request are written to the cache protected area.

Figure 3:
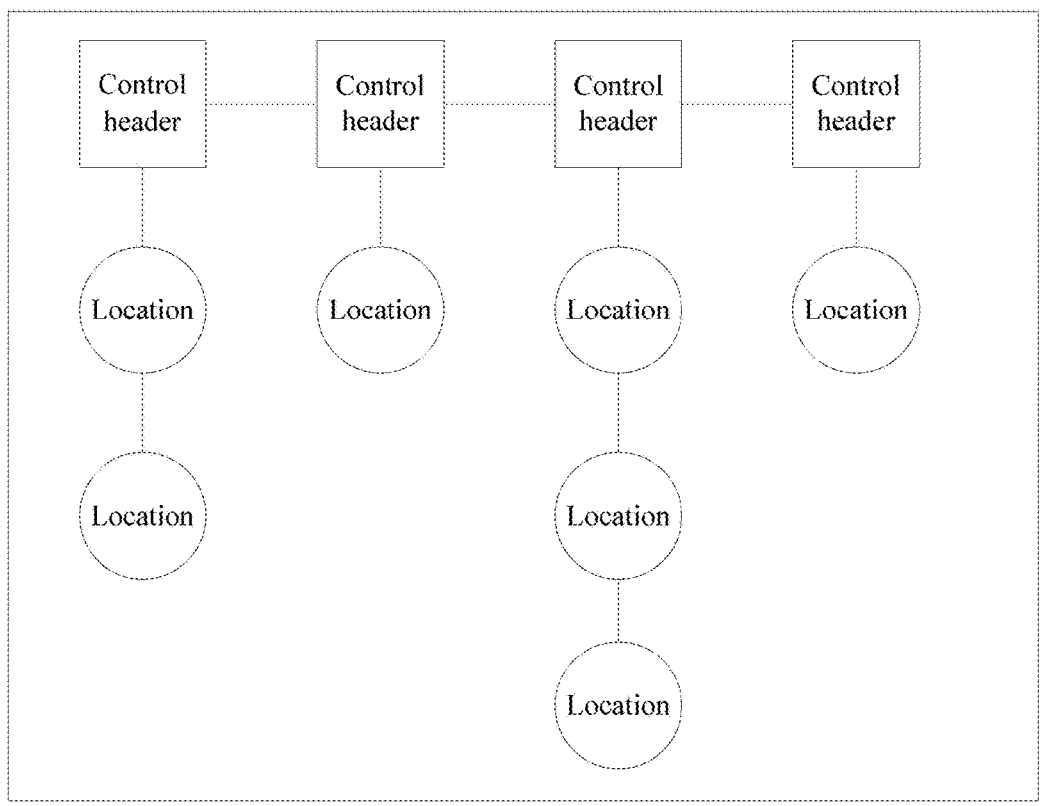
FIG. 3 is a schematic diagram of a data structure according to an embodiment of the present invention.

For example, the cache protected area may store data by using a certain data structure. As shown in FIG. 3, data in the cache protected area may be managed in a form of a control link, where the control link includes multiple control headers, and each control header corresponds to a file processing request. Under each control header, multiple slots (slots) are mounted, and each slot is used to store each piece of data or each piece of metadata corresponding to the file processing request.

Specifically, the file operation information may be traversed. First, one slot is requested for the first piece of data (for example, a file ID) in the control link and, after the slot is successfully requested, the first piece of data is written to the slot; then, one slot is requested for the second piece of data (for example, an offset) and after the slot is successfully requested, the second piece of data is written to the slot; and the rest is processed by analogy until the last piece of data in the file operation information is written to a slot. Then, a control header corresponding to the file processing request may be added to the control link.

After the control header corresponding to the file processing request is added to the control link, it indicates that all the data and the metadata corresponding to the file processing request are already written to the cache protected area successfully.

For another example, the data in the cache protected area may be managed in a form of a binary tree. The binary tree includes multiple root nodes, where each root node corresponds to a file processing request. Under each root node, multiple leaf nodes are mounted. Each leaf node is used to store each piece of data or each piece of metadata corresponding to the file processing request.

Specifically, the file operation information may be traversed. First, one leaf node is requested for the first piece of data (for example, a file ID) in the binary tree and, after the leaf node is requested successfully, the first piece of data is written to the leaf node; then, one leaf node is requested for the second piece of data (for example, an offset) and, after the leaf node is requested successfully, the second piece of data is written to the leaf node; and the rest is processed by analogy until the last piece of data is written to a leaf node. Then a root node corresponding to the file processing request may be added to the binary tree.

After a root node corresponding to the file processing request is added to the binary tree, it indicates that all the data and the metadata corresponding to the file processing request are already written to the cache protected area successfully.

It should be noted that a control link or a binary tree is a manner of a data structure that is used by a cache protected area to store data. In addition, data structures such as a B tree, a B+ tree, and a red-black tree may also be used to store data, which is not limited herein.

Alternatively, the cache protected area does not need to store data by using a data structure such as a control link or a binary tree. The first controller may traverse the file operation information. First, the first controller requests storage space for the first piece of data (for example, a file ID) in the cache protected area, and, after the storage space is successfully requested, writes the first piece of data to storage space of the cache protected area; then, the first controller requests storage space for the second piece of data (for example, an offset) in the cache protected area and, after the storage space is successfully requested, writes the second piece of data to the storage space of the cache protected area; and processes the rest by analog until the last piece of data is written to the storage space of the cache protected area. Then, a flag (for example, true) may be set in the file operation information stored in the cache protected area, so as to indicate that all the data and the metadata corresponding to the file processing request are already written to the cache protected area successfully. Optionally, when not all the data and the metadata corresponding to the file processing request are written to the cache protected area, another flag (for example, false) may also be set.

Alternatively, when the file system splits the file processing request into multiple file operations for separate processing, the file system may collect statistics of and records a quantity of all data entries and metadata entries included in the file operation information, and set a counter or a software module with a similar function in the first controller, where an initial value of the counter is 0. Each piece of data included in the file operation information is successively written to the requested storage space of the cache protected area. Each time when a piece of data is successfully written, the value of the counter increases by 1. If the value of the counter equals the recorded quantity of all the data entries and the metadata entries included in the file operation information, it indicates that all the data and the metadata corresponding to the file processing request are already written to the cache protected area successfully.

In an optional implementation manner, the writing the multiple pieces of file operation information to the cache protected area refers to an action of writing the multiple pieces of file operation information to the cache protected area, that is, there is no need to consider whether all the data and the metadata corresponding to the file processing request are written to the cache protected area.

In another embodiment of the present invention, if the first controller has a fault when not all the multiple pieces of file operation information are written to the cache protected area, processing of the file processing request is considered as failed.

Step 24: When the first controller has a fault, copy the file operation information stored in the cache protected area to a protected area of the memory by using a power failure protected program.

It can be known from the foregoing description that because the cache protected area provides the data protected function, when the first controller has a fault, the power failure protected program may be used to copy the file operation information stored in the cache protected area to the protected area of the memory. Therefore, the file operation information stored in the cache protected area is not lost due to the fault that the first controller has. The protected area of the memory refers to storage space that is in the memory and specially used to store data written by using the power failure protected program. Optionally, the file operation information may be found by searching by using a data structure (for example, a control link) corresponding to the cache protected area, or the file operation information may be by searching by using a flag that includes true, which is not limited herein.

Because step 23 has two different implementation manners, step 24 is different in specific implementation For example, when the first implementation manner is performed in step 23 (writing all the multiple pieces of file operation information to the cache protected area), other processing may not be performed for the file operation information stored in the cache protected area, and step 242 is performed: Copy the file operation information stored in the cache protected area to the protected area of the memory.

When the second implementation manner is performed in step 23 (not considering whether all the data and the metadata corresponding to the file processing request are written to the cache protected area), before step 242 is performed, the following may be further included:

Step 241: Determine whether the file operation information includes all the data and the metadata corresponding to the file processing request.

When the file operation information includes all the data and the metadata corresponding to the file processing request, step 242 is performed: Copy the file operation information stored in the cache protected area to the protected area of the memory by using the power failure protected program.

When the file operation information does not include all the data and the metadata corresponding to the file processing request, power failure protected processing is not performed for the file operation information stored in the cache protected area.

It should be noted that step 24 is an optional step in the embodiment of the present invention. Therefore, as described above, in addition to a power failure protected function, the data protected function may also be a reset memory protected function. When the cache protected area has the reset memory protected function, even if the first controller has a fault, the cache protected area can still supply power continuously and, after the first controller is powered on again, data in the cache protected area may be not initialized. Therefore, the data stored in the cache protected area is not lost.

Specifically, the determining whether the file operation information includes all the data and the metadata corresponding to the file processing request may be:

collecting statistics on the quantity of the data entries included in the file operation information in the cache protected area, and comparing the quantity with the quantity of all the data entries and the quantity of the metadata entries corresponding to the file processing request, which are recorded in the file system, where if the quantity of the data entries included in the file operation information in the cache protected area equals the quantity recorded in the file system, it indicates that the file operation information includes all the data and the metadata corresponding to the file processing request; or checking whether the data structure (for example, a control link) corresponding to the cache protected area includes a data structure (for example, a control header) corresponding to the file processing request, where if the control link includes the control header, it indicates that the multiple pieces of file operation information stored in the data structure corresponding to the file processing request include all the data and the metadata corresponding to the file processing request; or checking whether the file operation information stored in the cache protected area includes a flag (for example, true), where if the file operation information includes a flag of true, it indicates that the file operation information includes all the data and the metadata corresponding to the file processing request.

In addition, in another implementation manner of the present invention, when step 23 is performed and whether all the data and the metadata corresponding to the file processing request are written to the cache protected area is not considered, and whether the file operation information includes all the data and the metadata corresponding to the file processing request may not be determined, step 242 is directly performed: Copy the file operation information stored in the cache protected area to the protected area of the memory by using the power failure protected program.

It should be noted that, in an embodiment of the present invention, the multiple pieces of file operation information that are written to the cache protected area may be all the data and the metadata corresponding to the file processing request. In another embodiment of the present invention, the multiple pieces of file operation information that are written to the cache protected area may be addresses of all the data and the metadata corresponding to the file processing request, which are stored in the temporary cache. When the first controller has a fault and the power failure protected needs to be provided for the data stored in the cache by using the power failure protected program, all the data and the metadata corresponding to the file processing request may be first acquired according to the addresses of all the data and the metadata corresponding to the file processing request, which are stored in the temporary cache, and then all the data and the metadata corresponding to the file processing request are copied to the protected area of the memory.

Step 25: Restore multiple pieces of file operation information from the cache protected area when the first controller is powered on again after having a fault.

When the cache protected area has the power failure protected function, the file operation information stored in the protected area of the memory may be copied to the cache protected area by using the power failure protected program; when the cache protected area has the reset memory protected function, the data in the cache protected area is not initialized.

Optionally, when the first implementation manner (writing all the multiple pieces of file operation information to the cache protected area) is performed in step 23, step 252 may be performed: Copy the file operation information stored in the protected area of the memory to the cache protected area.

Optionally, when the second implementation manner (not considering whether all the data and the metadata corresponding to the file processing request are written to the cache protected area) is performed in step 23, and the file operation information in the cache protected area is copied to the protected area of the memory after it is determined, in step 24, that the file operation information includes all the data and the metadata corresponding to the file processing request, step 252 may be performed: Copy the file operation information stored in the protected area of the memory to the cache protected area.

Optionally, when the second implementation manner (not considering whether all the data and the metadata corresponding to the file processing request are written to the cache protected area) is performed in step 23, and in step 24, whether the file operation information includes all the data and the metadata corresponding to the file processing request is not determined, and the file operation information in the cache protected area is directly copied to the protected area of the memory, step 25 may include:

Step 251: Determine whether the file operation information stored in the protected area of the memory includes all the data and the metadata corresponding to the file processing request, and when it is determined that the file operation information includes all the data and the metadata corresponding to the file processing request, perform step 252: Copy the file operation information stored in the protected area of the memory to the cache protected area by using the power failure protected program.

Specifically, the determining whether the file operation information includes all the data and the metadata corresponding to the file processing request may be:

collecting statistics on the quantity of the data entries included in the file operation information stored in the protected area of the memory, and comparing the quantity with the quality of all the data entries and the quality of the metadata entries corresponding to the file processing request, which are recorded in the file system, where if the quantity of the data entries that is included in the file operation information stored in the protected area of the memory equals the quality recorded in the file system, it indicates that the file operation information includes all the data and the metadata corresponding to the file processing request; or checking whether the file operation information stored in the protected area of the memory includes a flag (for example, true), where if the file operation information includes a true flag, it indicates that the file operation information includes all the data and the metadata corresponding to the file processing request.

Step 26: Acquire data information according to the multiple pieces of file operation information and write the data information to the first write cache, so that the host or the memory accesses the data information.

Specifically, the data information may be acquired according to the multiple pieces of file operation information stored in the cache protected area, and the data information may be all the data and the metadata corresponding to the file processing request or the addresses of all the data and the metadata, which are stored in the cache protected area. After the data information is acquired, the data information is written to the first write cache.

It should be noted that when the data information is all the data and the metadata corresponding to the file processing request, the first write cache stores all the data and the metadata corresponding to the file processing request in a form that is different from a form used by the cache protected area to store all the data and the metadata corresponding to the file processing request. For example, the first write cache may store the data in a form of a page and the cache protected area may store the data in a form of a data structure, for example, a control link.

It can be known from the foregoing description that when the first controller is powered on again after having a fault, the multiple pieces of file operation information restored from the cache protected area refer to all the data and the metadata corresponding to the file processing request. Therefore, the data information that is acquired according to the multiple pieces of file operation information and written to the first write cache is also all the data and the metadata corresponding to the file processing request, or the addresses of all the data and the metadata, which are stored in the cache protected area. That is, the data that corresponds to the file processing request and is written to the first write cache meets the atomicity requirement. Therefore, the data information can be accessed by the host or the memory.

Specifically, the accessing, by the host, the data information indicates that the host sends a file access request to the first controller, where the file access request is used to access data corresponding to the file processing request. For example, when the file processing request is a file writing request, the file access request may require access to to-be-written data that corresponds to the file writing request. After receiving the file access request, the first controller may send the to-be-written data that is stored in the first write cache to the host.

Specifically, the accessing, by the memory, the data information indicates writing, to the memory, all the data and the metadata corresponding to the file processing request, which are stored in the first write cache. Because a capacity of the first write cache is less than a capacity of a hard disk, when the data stored in the first write cache reaches a certain threshold, the data stored in the first write cache needs to be written to the memory.

Optionally, after the data information is acquired according to the file operation information, the multiple pieces of file operation information that are stored in the cache protected area may be deleted.

In the embodiment of the present invention, all multiple pieces of file operation information corresponding to a file processing request are written to a cache protected area. Because the cache protected area provides a data protected function, when a first controller is powered on again after having a fault, the multiple pieces of file operation information can be restored from the cache protected area, and data information is acquired according to the multiple pieces of file operation information and written to a first write cache. Because all the multiple pieces of file operation information are written to the cache protected area, file operation information restored from the cache protected area when the first controller is powered on again after having a fault is also complete. Therefore, the data information acquired according to the multiple pieces of file operation information is atomic and can be directly accessed by a host or a memory. In the prior art, data information in a first write cache is not atomic and only data in a memory is atomic. Therefore, in the prior art, the data information in the first write cache cannot be directly accessed by a host and corresponding data must be read from the memory before being provided for the host. Compared with the prior art, the embodiment of the present invention improves the data access efficiency of the host.

In the foregoing embodiment, after performing step 26, the first controller may also acquire, according to the data information stored in the first write cache, all the data and the metadata corresponding to the file processing request, and write the data and the metadata to the memory. Because the capacity of the first write cache is limited, in general, when the data in the first write cache reaches a certain threshold, the data stored in the first write cache may be written to the memory.

Optionally, when all the data and the metadata corresponding to the file processing request are written to the memory, information that is not written to the memory may be stored to indicate which data is not written to the memory currently. If the first controller has a fault in a process in which the data and the metadata are written to the memory, the power failure protected program may be used to write the information that is not written to the memory to the protected area of the memory, and after the first controller is powered on again, the data that is not written to the memory may be acquired according to the information that is not written to the memory and the data that is not written to the memory is written continuously to the memory. Therefore, this avoids repeatedly writing data, which is already written to the memory, and improves efficiency of writing data.

Optionally, after all the data and the metadata corresponding to the file processing request are written to the memory, the information that is not written to the memory may be deleted.

Figure 4:
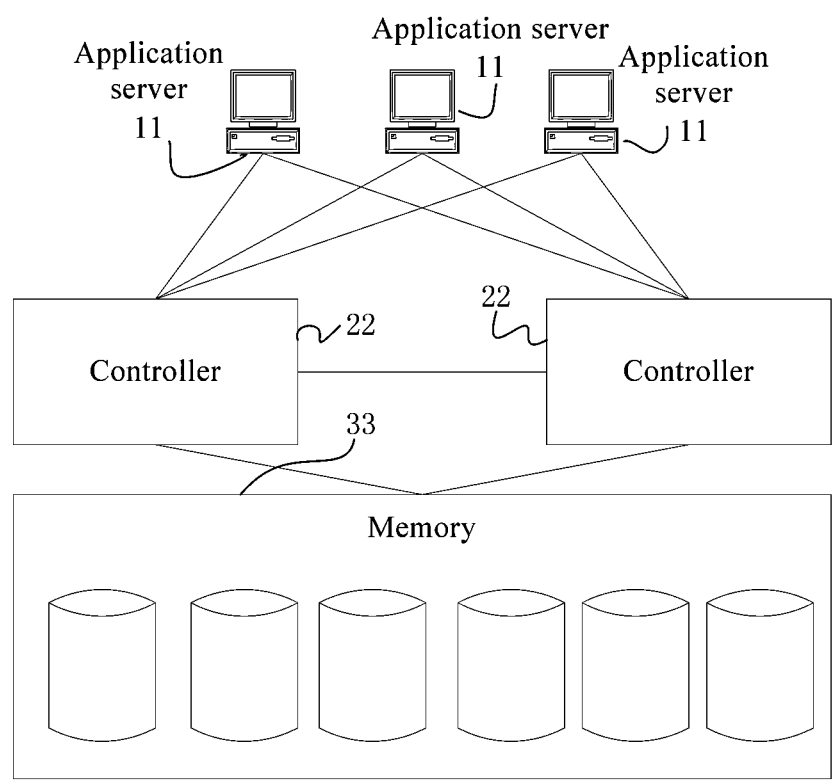
FIG. 4 is a schematic diagram of an application network architecture of another data storage method according to an embodiment of the present invention.

In addition, the embodiment of the present invention may also be applied to a storage system that includes two controllers. As shown in FIG. 4, the storage system includes at least one application server 11 (three shown in FIG. 3), two controllers 22, and one memory 33.

A structure and function of the application server 11, the controller 22, and the memory 33 are similar to those described in the foregoing embodiment, and details are not repeatedly described herein.

A difference is that the embodiment of the present invention may include two controllers 22, and the two controllers 22 have a same physical structure and function, and can receive a file processing request sent by the application server 11, and access data stored in the memory 33. In addition, the two controllers 22 may communicate with each other, for example, transmit data through a mirror channel or in another manner.

For ease of description, the two controllers 22 are classified into a first controller and a second controller, where a write cache included in the first controller is referred to as a first write cache, and a write cache included in the second controller is referred to as a second write cache.

The second write cache has a hardware structure similar to that of the first write cache. When the first controller is a primary controller and the second controller is a secondary controller, an attribute of the second write cache is mirror, and the second write cache is configured to receive data sent by the first controller. In this case, data in the second write cache is not provided for the host or written to the memory. When the second controller is a primary controller and the first controller is a secondary controller, an attribute of the second write cache is local. In this case, the data in the second write cache can be provided for the host or written to the memory.

Optionally, the embodiment of the present invention may further include:

sending, by the first controller, the multiple pieces of file operation information to the second controller.

Optionally, the first controller may send the multiple pieces of file operation information to the second controller after step 22, where the multiple pieces of file operation information may be all the data and the metadata corresponding to the file processing request. Specifically, the first controller may send a mirror message to the second controller, where the mirror message includes the multiple pieces of file operation information; or when the first controller splits the file processing request into multiple file operations and separately processes each file operation, the first controller may send a mirror message to the second controller after performing processing a file operation and generating corresponding data each time, where the mirror message includes data corresponding to the file operation. After sending a last mirror message to the second controller, the first controller may send an acknowledgement message to the second controller, so as to inform the second controller that the multiple pieces of file operation information are already sent.

Optionally, the first controller may send the multiple pieces of file operation information to the second controller after step 23. A sending manner thereof may be: The first controller sends a mirror message to the second controller, where the mirror message includes the multiple pieces of file operation information; or the first controller sends multiple mirror messages to the second controller, where each mirror message includes data corresponding to a file operation. After sending a last mirror message to the second controller, the first controller may send an acknowledgement message to the second controller to inform the second controller that the multiple pieces of file operation information are already sent.

Optionally, the first controller may send the multiple pieces of file operation information to the second controller after step 24. A specific sending manner thereof is similar to the manner described above, and details are not repeatedly described herein.

After receiving the multiple pieces of file operation information, the second controller may first write the multiple pieces of file operation information to the cache protected area and, after the multiple pieces of file operation information are already written to the cache protected area successfully, write the data information to a second write cache. The data information refers to all the data and the metadata corresponding to the file processing request or addresses of all the data and the metadata corresponding to the file processing request, which are stored in the cache protected area. It should be noted that the cache protected area refers to a cache protected area included in the second controller.

Therefore, data information stored in the second write cache is consistent with the data information stored in the first write cache. When the first controller has a fault, the second controller modifies the attribute of the second write cache to local, so as to replace the first controller to continue to work. For example, according to the data information stored in the second write cache, an operation corresponding to the file processing request is performed for the memory, or the data information stored in the second write cache is provided for the host.

In the prior art, when the first controller has a fault, the second controller first needs to read log information from the memory, acquire the data information according to the log information, and then provide the information for the host. In the embodiment of the present invention, when the first controller has a fault, the second controller may directly provide the data information stored in the second write cache for the host. It can be seen from the foregoing that the data access efficiency of the host is improved in the embodiment of the present invention.

Figure 5:
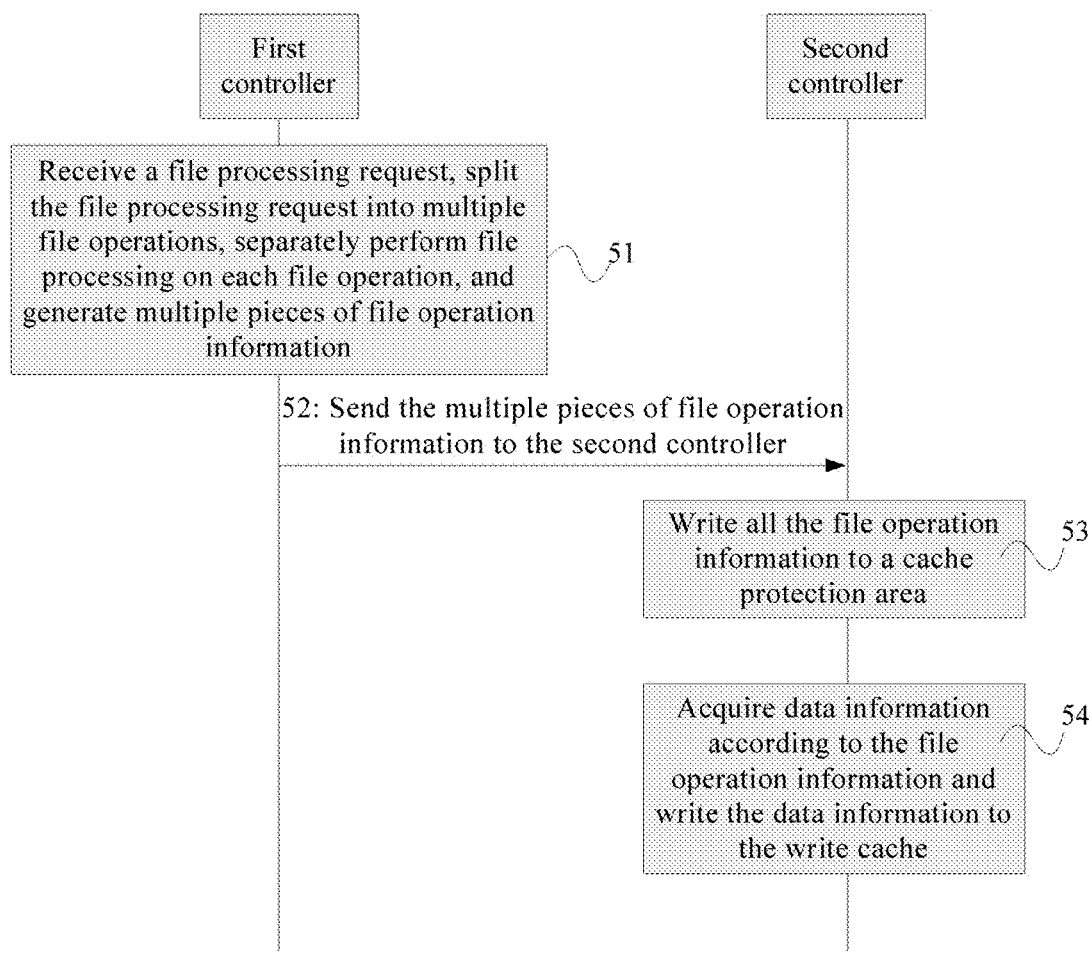
FIG. 5 is a flowchart of another data storage method according to an embodiment of the present invention.

The following describes another data storage method according to an embodiment of the present invention in detail. The method is applied to a storage system, the storage system includes storage devices and a host, the storage devices include a first controller, a second controller, and a memory, and the second controller includes a write cache and a cache protected area, and the write cache and the cache protected area provide a data protected function. As shown in FIG. 5, the method includes:

Step 51: The first controller receives a file processing request, splits the file processing request into multiple file operations, separately perform file processing on each file operation, and generates multiple pieces of file operation information.

The file processing request is sent by an application server (also referred to as a host). An operation type of the file processing request may be a file processing request for modifying data stored in the memory, for example, a file writing request, a file modification request, a file creation request, or a file deletion request, which is not limited herein. Different file processing requests may include different parameters. For example, a file writing request is used as an example, and the file writing request includes parameters such as a file ID, a file offset (offset), a file length (length), and to-be-written data.

For a storage device that has a file system, the file system often needs to split a file processing request into multiple file operations according to an operation type of the file processing request when processing the file processing request. For example, the file system needs to split a file writing request into a data modification file operation and a metadata modification file operation; for another example, the file system needs to split a file creation request into a parent directory modification file operation and a file operation for file creation; for still another example, the file system needs to split a file renaming request into a source directory modification file operation and a destination directory modification file operation.

Optionally, the file system splits the file processing request into the multiple file operations according to the operation type of the file processing request and, when performing processing on each file operation separately, may record a quantity of all data entries and a quantity of metadata entries corresponding to the file processing request.

It can be understood that when processing a file processing request, the first controller actually performs semantic conversion or other file processing successively for each file operation split from the file processing request. Each time after processing a file operation, the first controller writes data corresponding to the file operation and metadata to a temporary cache. Therefore, after the first controller processes a last file operation and writes the data corresponding to the last file operation and the metadata to the temporary cache, all the data and the metadata corresponding to the file processing request are also written to the temporary cache. Therefore, in the embodiment of the present invention, data stored in the temporary cache is all the data and the metadata corresponding to the file processing request. Similarly, in the embodiment of the present invention, the multiple pieces of file operation information are all the data and the metadata corresponding to the file processing request.

For different file processing requests, file operation information generated for the different file processing requests is also different. When the file processing request is a file writing request, file operation information of the file processing request may be to-be-written data, metadata, and so on carried in the file writing request; when the file processing request is a file modification request, file operation information of the file modification request may be to-be-written data, metadata, and so on carried in the file modification request; when the file processing request is a file creation request, file operation information of the file creation request may be directory information, metadata, and so on; when the file processing request is a file deletion request, file operation information of the file deletion request may be special page data for releasing file space, and the data and metadata after deletion, and so on.

The following steps are described by using a file writing request as an example. For the file writing request, file operation information generated for the file writing request may include a file ID, a file offset (offset), a file length (length), a write time, to-be-written data, and so on.

Step 52: Write the multiple pieces of file operation information to the second controller.

Optionally, the first controller may send a mirror message to the second controller, where the mirror message includes the multiple pieces of file operation information; or when the first controller splits the file processing request into multiple file operations and separately processes each file operation, the first controller may send a mirror message to the second controller after processing a file operation and generating corresponding data each time, where the mirror message includes data corresponding to the file operation. After sending a last mirror message to the second controller, the first controller may send an acknowledgement message to the second controller, so as to inform the second controller that the multiple pieces of file operation information are already sent.

Step 53: The second controller writes all the file operation information to the cache protected area.

Specifically, the second controller may write the file operation information such as a file ID, a file offset, a file length, a write time, and to-be-written data to the cache protected area. The cache protected area provides a data protected function. When file operation information is written to the cache protected area successfully, the file operation information is not lost due to a reason such as a system fault.

It should be noted that the writing the multiple pieces of file operation information to the cache protected area indicates that all the multiple pieces of file operation information are written to the cache protected area, that is, all the data and the metadata corresponding to the file processing request are written to the cache protected area.

For example, the cache protected area may store data by using a certain data structure. As shown in FIG. 3, data in the cache protected area may be managed in a form of a control link, where the control link includes multiple control headers, and each control header corresponds to a file processing request. Under each control header, multiple slots (slots) are mounted, and each slot is used to store each piece of data or each piece of metadata corresponding to the file processing request.

Specifically, the file operation information may be traversed. First, one slot is requested for the first piece of data (for example, a file ID) in the control link and, after the slot is successfully requested, the first piece of data is written to the slot; then, one slot is requested for the second piece of data (for example, an offset) and after the slot is successfully requested, the second piece of data is written to the slot; and the rest is processed by analogy until the last piece of data in the file operation information is written to a slot. Then, a control header corresponding to the file processing request may be added to the control link.

After the control header corresponding to the file processing request is added to the control link, it indicates that all the data and the metadata corresponding to the file processing request are already written to the cache protected area successfully.

For another example, the data in the cache protected area may be managed in a form of a binary tree. The binary tree includes multiple root nodes, where each root node corresponds to a file processing request. Under each root node, multiple leaf nodes are mounted. Each leaf node is used to store each piece of data or each piece of metadata corresponding to the file processing request.

Specifically, the file operation information may be traversed. First, one leaf node is requested for the first piece of data (for example, a file ID) in the binary tree and, after the leaf node is requested successfully, the first piece of data is written to the leaf node; then, one leaf node is requested for the second piece of data (for example, an offset) and, after the leaf node is requested successfully, the second piece of data is written to the leaf node; and the rest is processed by analogy until the last piece of data is written to a leaf node. Then, a root node corresponding to the file processing request may be added to the binary tree.

After the root node corresponding to the file processing request is added to the binary tree, it indicates that all the data and the metadata corresponding to the file processing request are already written to the cache protected area successfully.

It should be noted that a control link or a binary tree is a manner of a data structure that is used by a cache protected area to store data. In addition, data structures such as a B tree, a B+ tree, and a red-black tree may also be used to store data, which is not limited herein.

Alternatively, the cache protected area does not need to store data by using a data structure such as a control link or a binary tree. The first controller may traverse the file operation information. First, the first controller requests storage space for the first piece of data (for example, a file ID) in the cache protected area, and, after the storage space is successfully requested, writes the first piece of data to storage space of the cache protected area; then, the first controller requests storage space for the second piece of data (for example, an offset) in the cache protected area and, after the storage space is successfully requested, writes the second piece of data to the storage space of the cache protected area; and processes the rest by analog until the last piece of data is written to the storage space of the cache protected area. Then, a flag (for example, true) may be set in the file operation information stored in the cache protected area, so as to indicate that all the data and the metadata corresponding to the file processing request are already written to the cache protected area successfully. Optionally, when not all the data and the metadata corresponding to the file processing request are written to the cache protected area, another flag (for example, false) may also be set.

Alternatively, when the file system splits the file processing request into multiple file operations for separate processing, the file system may collect statistics of and records a quantity of all data entries and metadata entries included in the file operation information, and set a counter or a software module with a similar function in the second controller, where an initial value of the counter is 0. Each piece of data included in the file operation information is successively written to the requested storage space of the cache protected area. Each time when a piece of data is successfully written, the value of the counter increases by 1. If the value of the counter equals the recorded quantity of all the data entries and the metadata entries included in the file operation information, it indicates that all the data and the metadata corresponding to the file processing request are already written to the cache protected area successfully.

Step 54: The second controller acquires data information according to the file operation information and writes the data information to the write cache.

Specifically, the data information may be all the data and the metadata corresponding to the file processing request or addresses of all the data and the metadata corresponding to the file processing request, which are stored in the cache protected area.

When the first controller has a fault, the second controller may provide the data information stored in the write cache for the host or perform an operation corresponding to the file processing request for the memory, for example, creating a file, deleting a file, and writing a file.

It should be noted that step 53 is an optional step and is used, when the second controller has a fault in a process of writing the data information to the write cache, to restore the data information according to the multiple pieces of file operation information stored in the cache protected area and write the data information to the write cache.

Correspondingly, the embodiment of the present invention may also include:

when the second controller has a fault, determining, according to a data structure corresponding to the cache protected area, that the cache protected area includes the multiple pieces of file operation information; and storing the multiple pieces of file operation information to a protected area of the memory by using a power failure protected program; or when the second controller has a fault, determining, according to the flag, that the cache protected area includes the multiple pieces of file operation information; and storing the multiple pieces of file operation information to a protected area of the memory by using a power failure protected program.

For a specific implementation manner, reference may be made to step 23 to step 26 in the foregoing embodiment, and details are not repeatedly described herein.

Optionally, the embodiment of the present invention may also include: after the first controller writes the multiple pieces of file operation information to the cache protected area of the first controller, when the first controller has a fault and is powered on again, restoring the multiple pieces of file operation from the cache protected area of the first controller, acquiring the data information according to the file operation information, and writing the data information to the write cache of the first controller. For a specific implementation manner, reference may be made to step 23 to step 26 in the foregoing embodiment, and details are not repeatedly described herein.

In the prior art, data atomicity is guaranteed in the memory, and data in the write cache cannot be directly provided for the host. Therefore, when the first controller has a fault, the second controller needs to read corresponding log information from the memory, restore the data information from the write cache according to the log information, and provide the information for the host. In the embodiment of the present invention, however, because the first controller sends the multiple pieces of file operation information to the second controller before a fault occurs and the second controller acquires the data information according to the multiple pieces of file operation information and writes the data information to the write cache, when the first controller has a fault, the second controller may directly provide data in the write cache for the host or perform an operation corresponding to the file processing request for the memory.

Apparatus According to an Embodiment of the Present Invention

Figure 6:
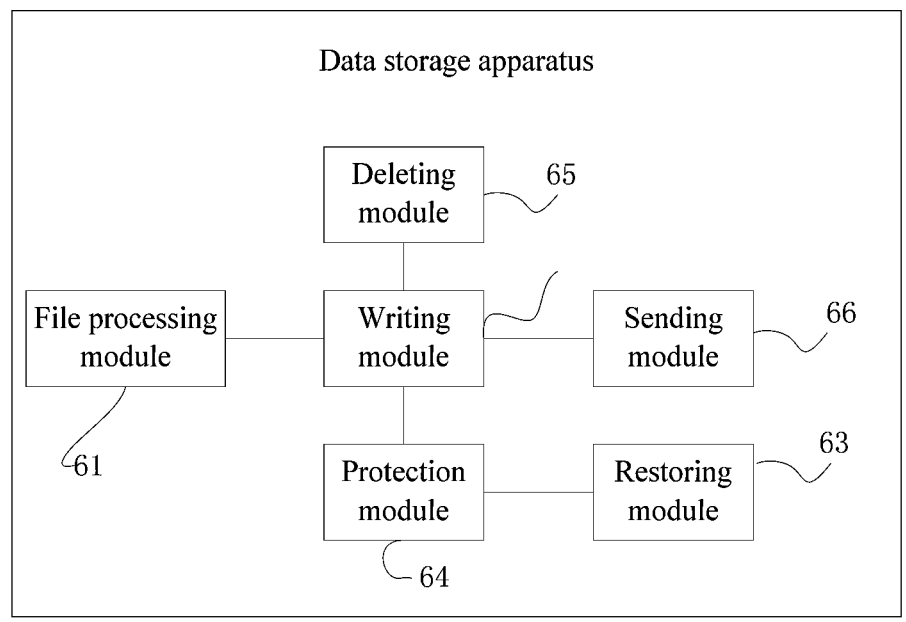
FIG. 6 is a schematic structural diagram of a data storage apparatus according to an embodiment of the present invention.

An embodiment of the present invention provides a data storage apparatus, and as shown in FIG. 6, the apparatus includes:

a file processing module 61, configured to receive a file processing request, split the file processing request into multiple file operations, separately perform file processing on each file operation, and generate multiple pieces of file operation information;

a writing module 62, configured to write all the multiple pieces of file operation information to a cache protected area; and a restoring module 63, configured to restore the multiple pieces of file operation information from the cache protected area when the first controller is powered on again after having a fault, where the writing module 62 is further configured to acquire data information according to the multiple pieces of file operation information and write the data information to a first write cache, so that the host accesses the data information.

Optionally, the writing module 62 is specifically configured to:

request storage space in the cache protected area for each piece of file operation information;

store each piece of file operation information in the requested storage space;

determine that all the multiple pieces of file operation information are already stored in corresponding storage space; and store, in a data structure corresponding to the cache protected area, data in the storage space in which the multiple pieces of file operation information are stored.

Optionally, the writing module 62 is specifically configured to:

send each piece of file operation information to the cache protected area successively;

determine that all the multiple pieces of file operation information are already sent to the cache protected area; and mark the multiple pieces of file operation information received in the cache protected area as completed data, where the completed data is used to indicate that all the multiple pieces of file operation information are already written to the cache protected area.

Optionally, the apparatus may further include:

a protected module 64, configured to: when the first controller has a fault, determine, according to the data structure corresponding to the cache protected area, that the cache protected area includes the multiple pieces of file operation information, and store the multiple pieces of file operation information in a protected area of a memory by using a power failure protected program; or a protected module 64, configured to: when the first controller has a fault, determine, according to the flag, that the cache protected area includes the multiple pieces of file operation information and store the multiple pieces of file operation information in a protected area of a memory by using a power failure protected program.

Optionally, the apparatus may further include:

a deleting module 65, configured to delete the multiple pieces of file operation information stored in the cache protected area.

Optionally, the apparatus may further include:

a sending module 66, configured to send the multiple pieces of file operation information to the second controller, so that the second controller acquires, according to the multiple pieces of file operation information, data information corresponding to the file processing request and writes the data information to the second write cache of the second controller.

The apparatus provided by the embodiment of the present invention may be set in the first controller described in the foregoing embodiment and is configured to execute the data storage method described in the foregoing embodiment. For a detailed description of functions of various modules, reference may be made to the description in the method embodiments, and details are not repeatedly described herein.

Figure 7:
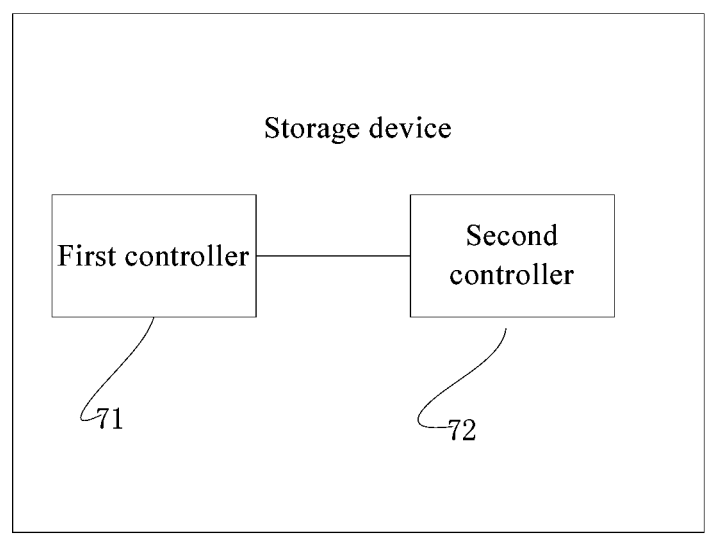
FIG. 7 is a schematic structural diagram of a storage device according to an embodiment of the present invention.

FIG. 7 shows a storage device according to an embodiment of the present invention, where the storage device includes a first controller 71, a second controller 72, and a memory, and the second controller includes a write cache.

The first controller 71 is configured to receive a file processing request, split the file processing request into multiple file operations, separately perform file processing on each file operation, generate multiple pieces of file operation information, and send the multiple pieces of file operation information to the second controller 72.

Optionally, the first controller 71 is specifically configured to send a first mirror message to the second controller 72, where the first mirror message includes the multiple pieces of file operation information.

Optionally, the first controller 72 is specifically configured to send multiple second mirror messages to the second controller 72, where each of the second mirror messages includes one of the multiple pieces of file operation information.

The second controller 72 is configured to acquire data information according to the file operation information and write the data information to the write cache, so that when the first controller 71 has a fault, a host accesses the data information or performs an operation corresponding to the file processing request for the memory.

Optionally, the second controller 72 is further configured to write all the file operation information to the cache protected area.

Specifically, the second controller 72 is configured to request storage space in the cache protected area for each piece of file operation information, store each piece of file operation information in the requested storage space, determine that all the multiple pieces of file operation information are already stored in corresponding storage space, and store, in a data structure corresponding to the cache protected area, data in the storage space in which the multiple pieces of file operation information are stored; or the second controller 72 is configured to send each piece of file operation information to the cache protected area successively, determine that all the multiple pieces of file operation information are already sent to the cache protected area, and set a flag corresponding to the multiple pieces of file operation information received in the cache protected area, where the flag is used to indicate that all the multiple pieces of file operation information are already written to the cache protected area.

Optionally, the second controller 72 is further configured to determine, according to the data structure corresponding to the cache protected area, that the cache protected area includes the multiple pieces of file operation information and store the multiple pieces of file operation information in a protected area of the memory by using a power failure protected program.

Optionally, the second controller 72 is further configured to determine, according to the flag, that the cache protected area includes the multiple pieces of file operation information and store the multiple pieces of file operation information in a protected area of the memory by using a power failure protected program.

The storage device according to the embodiment of the present invention may be set in the storage device that includes at least two controllers, as described in the foregoing embodiment, and is configured to execute the data storage method described in the foregoing embodiment. For a detailed description of functions of the controllers, reference may be made to the description in the method embodiment, and details are not repeatedly described herein.

Figure 8:
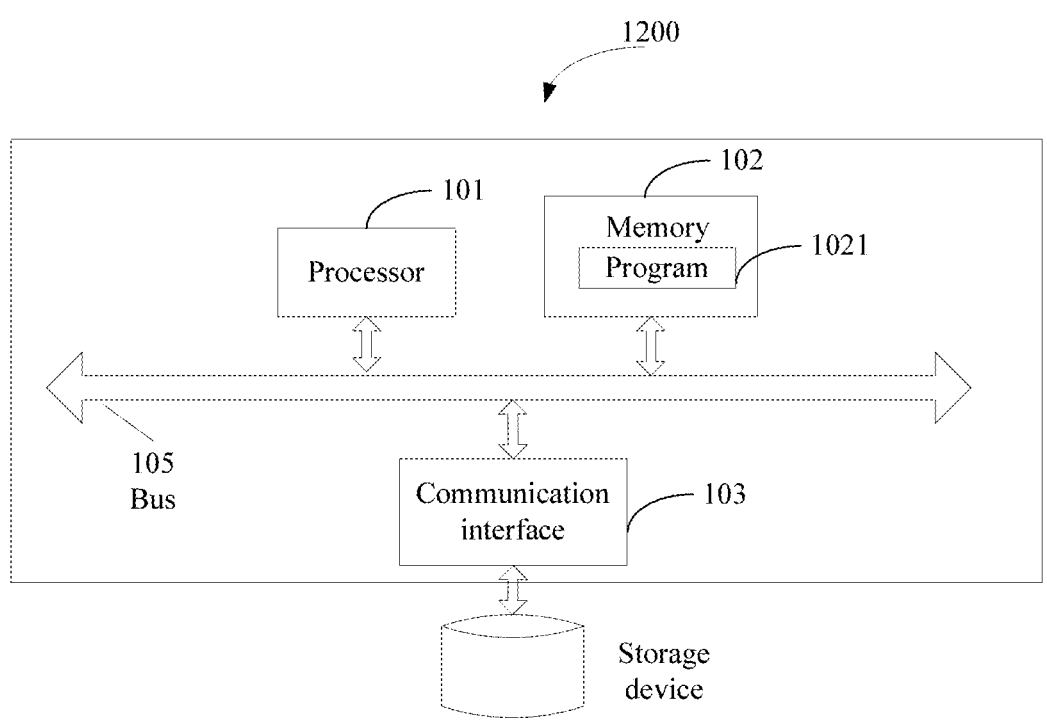
FIG. 8 is a schematic structural diagram of another storage device according to an embodiment of the present invention.

FIG. 8 shows a storage device according to an embodiment of the present invention, and the storage device includes:

a processor 101, a memory 102, a system bus (bus for short) 105, and a communication interface 103. The processor 101, the memory 102, and the communication interface 103 are connected by using the system bus 105 and communicate with each other.

The processor 101 may be a single-core or multi-core central processing unit, an application specific integrated circuit, or one or more integrated circuits configured to implement the embodiment of the present invention.

The memory 102 may be a high-speed RAM memory or a non-volatile memory (non-volatile memory), for example, at least one disk memory.

The communication interface 103 is configured to communicate with a storage device.

The memory 102 is configured to store a computer execution instruction 1021. Specifically, the computer execution instruction 1021 may include program code.

When a computer is running, the processor 101 runs the computer execution instruction 1021, and may execute the method procedure shown in FIG. 2.

It may be clearly understood by persons skilled in the art that, for the purpose of convenient and brief description, for a detailed working process of the foregoing device and module, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the module division is merely logical function division and may be other division in actual implementation. For example, a plurality of modules or components may be combined or integrated in another device, or some features may be ignored or not performed. In addition, the displayed or discussed mutual couplings or direct couplings or communication connections may be implemented through some communication interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network sub-modules. A part or all of the modules may be selected according to actual needs to achieve the objectives of the solutions of the embodiments.

In addition, functional modules in the embodiments of the present invention may be integrated in one processing module, or each of the modules may exist alone physically, or two or more modules are integrated in one module.

Persons of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

We claim:

1. A method performed by a controller of a storage device for storing data into the storage device, comprising:
    receiving a file process request;
    dividing the file process request into a plurality of file operations;
    processing each of the file operations to generate multiple pieces of file operation information;
    requesting storage space in the cache protected area for each piece of file operation information;
    storing each piece of file operation information in the requested storage space;
    determining that all the multiple pieces of file operation information have been stored in corresponding storage space;
    organizing the multiple pieces of file operation information stored in the requested storage space into a data structure to indicate all the multiple pieces of file operation information corresponding to the file request are in the cache protected area;
    storing information describing the data structure in the cache protected area;
    storing the multiple pieces of file operation information to a disk protected area of a storage disk in the storage device when a power failure at the controller is detected;
    copying the multiple pieces of file operation information from the disk protected area to the cache protected area when the power failure at the controller is over; and
    writing the file operation information into a write cache of the controller.

2. The method according to claim 1, before the step of storing the multiple pieces of file operation information to a disk protected area, the method further comprises:
    determining that all of the multiple pieces of file operation information have been stored in the cache protected area, based on the data structure.

3. A method performed by a controller of a storage device for storing data into the storage device, comprising:
    receiving a file process request;
    dividing the file process request into a plurality of file operations;
    processing each of the file operations to generate multiple pieces of file operation information;
    writing each piece of file operation information into the cache protected area;
    determining that all the multiple pieces of file operation information have been stored in the cache protected area;
    setting a flag corresponding to the multiple pieces of file operation information stored in the cache protected area, wherein the flag is used to indicate that all the multiple pieces of file operation information corresponding to the file request are in the cache protected area;
    storing the multiple pieces of file operation information to a disk protected area of a storage disk in the storage device when a power failure at the controller is detected;
    copying the multiple pieces of file operation information from the disk protected area to the cache protected area when the power failure at the controller is over;
    acquiring data information according to the multiple pieces of file operation information; and
    writing the data information into a write cache of the controller.

4. The method according to claim 3, before the step of storing the multiple pieces of file operation information to a disk protected area, the method further comprises:
    determining that all of the multiple pieces of file operation information have been stored in the cache protected area, based on the flag.

5. A method for storing data into a storage device having a first controller and a second controller, the method comprising:
    receiving, by the first controller, a file process request;
    dividing, by the first controller, the file process request into a plurality of file operations;
    processing, by the first controller, each of the file operations to generate multiple pieces of file operation information;
    sending, by the first controller, all of the multiple pieces of file operation information to the second controller;
    requesting, by the second controller, storage space in the cache protected area for each piece of file operation information;
    storing, by the second controller, each piece of file operation information in the requested storage space;
    determining, by the second controller, that all the multiple pieces of file operation information have been stored in corresponding storage space;
    organizing, by the second controller, the multiple pieces of file operation information stored in the requested storage space into a data structure to indicate all the multiple pieces of file operation information corresponding to the file request are in the cache protected area;

storing, by the second controller, information describing the data structure in the cache protected area;

storing, by the second controller, the multiple pieces of file operation information to a disk protected area of a storage disk in the storage device when a power failure at the second controller is detected;

copying, by the second controller, the multiple pieces of file operation information from the disk protected area to the cache protected area when the power failure at the second controller is over; and writing, by the second controller, the file operation information into a write cache of the second controller.

6. The method according to claim 5, before the step of storing, by the second controller, the multiple pieces of file operation information to a disk protected area, the method further comprises:

determining, by the second controller, that all of the multiple pieces of file operation information have been stored in the cache protected area, based on the data structure.

7. A method for storing data into a storage device having a first controller and a second controller, the method comprising:

receiving, by the first controller, a file process request;

dividing, by the first controller, the file process request into a plurality of file operations;

processing, by the first controller, each of the file operations to generate multiple pieces of file operation information;

sending, by the first controller, all of the multiple pieces of file operation information to the second controller;

writing, by the second controller, each piece of file operation information into the cache protected area;

determining, by the second controller, that all the multiple pieces of file operation information have been stored in the cache protected area;

setting, by the second controller, a flag corresponding to the multiple pieces of file operation information stored in the cache protected area, wherein the flag is used to indicate that all the multiple pieces of file operation information corresponding to the file request are in the cache protected area;

storing, by the second controller, the multiple pieces of file operation information to a disk protected area of a storage disk in the storage device when a power failure at the second controller is detected;

copying, by the second controller, the multiple pieces of file operation information from the disk protected area to the cache protected area when a power failure at the second controller is over; and writing, by the second controller, the file operation information into a write cache of the second controller.

8. The method according to claim 7, before the step of storing, by the second controller, the multiple pieces of file operation information to a disk protected area, the method further comprises:

determining, by the second controller, that all of the multiple pieces of file operation information have been stored in the cache protected area, based on the flag.

9. A storage device, comprising:
storage disks; and
a controller;
wherein the controller is configured to:
receive a file process request;
divide the file process request into a plurality of file operations;
process each of the file operations to generate multiple pieces of file operation information;
request storage space in the cache protected area for each piece of file operation information;
store each piece of file operation information in the requested storage space;
determine that all the multiple pieces of file operation information have been stored in corresponding storage space;
organize the multiple pieces of file operation information stored in the requested storage space into a data structure to indicate all the multiple pieces of file operation information corresponding to the file request are in the cache protected area;
store information describing the data structure in the cache protected area;
store the multiple pieces of file operation information to a disk protected area of a storage disk in the storage device when a power failure at the controller is detected;
copy the multiple pieces of file operation information from the disk protected area to the cache protected area when the power failure at the controller is over; and
write the file operation information into a write cache of the controller.

10. The storage device according to claim 9; wherein before storing the multiple pieces of file operation information to a disk protected area, the controller is further configured to determine that all of the multiple pieces of file operation information have been stored in the cache protected area, based on the data structure.

11. A storage device comprising:
storage disks; and
a controller, wherein the controller is configured to:
receive a file process request;
divide the file process request into a plurality of file operations;
process each of the file operations to generate multiple pieces of file operation information;
write each piece of file operation information into the cache protected area;
determine that all the multiple pieces of file operation information have been stored in the cache protected area;
set a flag corresponding to the multiple pieces of file operation information stored in the cache protected area, wherein the flag is used to indicate that all the multiple pieces of file operation information corresponding to the file request are in the cache protected area;
store the multiple pieces of file operation information to a disk protected area of a storage disk in the storage device when a power failure at the controller is detected;
copy the multiple pieces of file operation information from the protected area to the cache protected area when the power failure at the controller is over; and
write the file operation information into a write cache of the controller.

12. The storage device according to claim 11, wherein before storing the multiple pieces of file operation information to a disk protected area, the controller is further configured to determine that all of the multiple pieces of file operation information have been stored in the cache protected area, based on the flag.

13. A storage device, comprising
a first controller and a second controller;
wherein the first controller is configured to:
   receive a file process request;
   divide the file process request into a plurality of file operations;
   process each of the file operations to generate multiple pieces of file operation information;
   send all of the multiple pieces of file operation information to the second controller;
the second controller is configured to:
   request storage space in the cache protected area for each piece of file operation information;
   store each piece of file operation information in the requested storage space;
   determine that all the multiple pieces of file operation information have been stored in corresponding storage space; organize the multiple pieces of file operation information stored in the requested storage space into a data structure to indicate all the multiple pieces of file operation information corresponding to the file request are in the cache protected area;
   store information describing the data structure in the cache protected area;
   store the multiple pieces of file operation information to a disk protected area of a storage disk in the storage device when a power failure at the second controller is detected;
   copy the multiple pieces of file operation information from the disk protected area to the cache protected area when the power failure at the second controller is over; and
   write the file operation information into a write cache of the second controller.

14. The storage device according to claim 13, wherein before storing the multiple pieces of file operation information to a disk protected area, the second controller is further configured to determine that all of the multiple pieces of file operation information have been stored in the cache protected area, based on the data structure.

15. A storage device comprising a first controller and a second controller;
wherein the first controller is configured to
   receive a file process request;
   divide the file process request into a plurality of file operations;
   process each of the file operations to generate multiple pieces of file operation information; and
   send all of the multiple pieces of file operation information to the second controller; and
the second controller is configured to write each piece of file operation information into the cache protected area;
   determine that all the multiple pieces of file operation information have been stored in the cache protected area;
   set a flag corresponding to the multiple pieces of file operation information stored in the cache protected area, wherein the flag is used to indicate that all the multiple pieces of file operation information corresponding to the file request are in the cache protected area;
   store the multiple pieces of file operation information to a disk protected area of a storage disk in the storage device when a power failure at the second controller is detected;
   copy the multiple pieces of file operation information from the disk protected area to the cache protected area when the power failure at the second controller is over; and
   write the file operation information into a write cache of the second controller.

16. The storage device according to claim 15, wherein before storing the multiple pieces of file operation information to a disk protected area, the second controller is further configured to determine that all of the multiple pieces of file operation information have been stored in the cache protected area, based on the flag.

* * * * *